United States Patent [19]
Kohlhepp et al.

[11] Patent Number: 5,401,799
[45] Date of Patent: Mar. 28, 1995

[54] POLYPHENYLENE SULFIDE-BASED THERMOPLASTIC MOLDING COMPOSITION OF HIGH WEAR STRENGTH, AND THE USE THEREOF

[75] Inventors: Klaus Kohlhepp, Eppstein/Ts.; Dietrich Fleischer, Darmstadt; Peter Christ, Wiesbaden, all of Germany

[73] Assignee: Hoechst Aktiengesellschaft, Germany

[21] Appl. No.: 131,202

[22] Filed: Oct. 1, 1993

[30] Foreign Application Priority Data

Oct. 3, 1992 [DE] Germany ............ 42 33 310.5

[51] Int. Cl.$^6$ ............................................. C08K 7/14
[52] U.S. Cl. ................................. 524/425; 524/449; 524/447; 524/494
[58] Field of Search .......... 525/189; 524/494, 425, 524/449, 447, 451, 609

[56] References Cited

U.S. PATENT DOCUMENTS

| | | | |
|---|---|---|---|
| 4,487,879 | 12/1984 | Needham | 524/609 |
| 4,544,700 | 10/1985 | Wright | 524/609 |
| 5,258,442 | 11/1993 | Kato et al. | 524/609 |

FOREIGN PATENT DOCUMENTS

| | | |
|---|---|---|
| 0001281 | 4/1979 | European Pat. Off. . |
| 0329176 | 8/1989 | European Pat. Off. . |
| 0330488 | 8/1989 | European Pat. Off. . |
| 61-040357 | 2/1986 | Japan . |
| 61-285256 | 12/1986 | Japan . |
| 63-205356 | 8/1988 | Japan . |

OTHER PUBLICATIONS

Patent Abstract of Japan JP 53123458 published Oct. 17, 1978.
Patent Abstract of Japan JP4063866 published Feb. 28, 1992.
Second Edition "Encyclopedia of Polymer Science and Engineering", vol. 6, p. 490.

Primary Examiner—Veronica P. Hoke
Attorney, Agent, or Firm—Connolly & Hutz

[57] ABSTRACT

A thermoplastic molding composition comprising (A) from 20 to 70% by weight of polyphenylene sulfide, (B) from 5 to 20% by weight of ultrahigh-molecular-weight polyethylene, (C) from 10 to 40% by weight of a fibrous reinforcing agent, (D) from 10 to 40% by weight of an inorganic filler, and (E) from 0 to 1% by weight of a lubricant and/or other additives is used to produce moldings, fibers and films having particularly good wear properties.

9 Claims, No Drawings

POLYPHENYLENE SULFIDE-BASED THERMOPLASTIC MOLDING COMPOSITION OF HIGH WEAR STRENGTH, AND THE USE THEREOF

The invention relates to polyphenylene sulfide-based thermoplastic molding compositions which contain ultra high-molecular-weight polyethylene and have been provided with fibrous reinforcing agents and inorganic fillers, and to the preparation and use thereof. Moldings produced from these molding compositions have particularly good wear properties.

Polyphenylene sulfides can be used as raw materials for the production of moldings, fibers and films. Due to their partially crystalline structure, they have excellent properties, for example great hardness and high rigidity, inherent flame retardancy, good wear strength, favorable creep behavior and high dimensional accuracy. An additional improvement in the mechanical properties, and in particular the heat distortion resistance, can be achieved by incorporating reinforcing materials, for example glass fibers, and also mineral fillers, for example talc, chalk and mica. However, polyphenylene sulfide molding compositions to which inorganic reinforcing materials and fillers are added sometimes have an abrasion resistance which is inadequate for many applications.

It is known that addition of ultrahigh-molecular-weight polyethylene (UHMW-PE) to plastics gives products having better sliding properties and thus higher wear resistance (EP-A 0 329 176). Polyphenylene sulfide has been treated, for example for applications as a sliding material, with potassium titanate fibers and a high-molecular-weight, solid lubricant, such as polytetrafluoroethylene (PTFE), high-density polyethylene (HD-PE) and UHMW-PE (JP-A 61/040 357). Polyphenylene sulfide has also been extruded and processed together with glass fibers and 2% by weight of UHMW-PE (molecular weight about 1,000,000) (JP-A 61/285 256).

Furthermore, polyphenylene sulfide resins having good sliding properties and mechanical properties are described in JP-A 63/205 356. They contain one or more reinforcing materials made from heat-resistant fibers or inorganic whiskers and polyethylene powder of ultra high molecular weight. As inorganic whiskers, mention is made of potassium titanate, boron carbide, silicon carbide, silicon nitride and beryllium oxide. These were employed in amounts of from 5 to 40 parts by weight per 100 parts by weight of polyphenylene sulfide. Moldings made from three-component mixtures of this type were produced and are said to have improved tensile and flexural strengths.

The object was to improve the abrasion resistance of polyphenylene sulfide moldings containing inorganic reinforcing materials and fillers.

The invention therefore relates to a thermoplastic molding composition comprising
(A) from 20 to 70% by weight, preferably from 25 to 50% by weight, of polyphenylene sulfide,
(B) from 5 to 20% by weight, preferably from 7 to 17% by weight, of ultrahigh-molecular-weight polyethylene,
(C) from 10 to 40% by weight, preferably from 20 to 30% by weight, of a fibrous reinforcing agent,
(D) from 10 to 40% by weight, preferably from 20 to 30% by weight, of an inorganic filler, and
(E) from 0 to 1% by weight of a lubricant and/or other additives, where the total amount of components (A) to (E) is 100% by weight.

This molding composition gives moldings having particularly good wear behavior, i.e. high abrasion resistance, based on polyphenylene sulfide, where the individual constituents are converted in conventional mixers into molding compositions, and the desired moldings are then produced from the latter in conventional processing machines.

While the abrasion resistance of the molding compositions according to the invention is surprisingly significantly improved, other mechanical properties remain essentially the same.

Component (A) (=polyphenylene sulfide) is a commercial product prepared in a polymerization reaction from p-dichlorobenzene and sodiumsulfide at elevated temperature. Its molecular weight is about 18,000 (determined in chloronaphthalene at 235° C.). The viscosity is about 300 P at 1200 s$^{-1}$ and 315° C.

Component (B) (=UHMW-PE) has a mean molecular weight of at least 1,000,000. The fibrous reinforcing materials are glass fibers or other heat-resistant inorganic or organic fiber materials. Preference is given to glass fibers.

Inorganic fillers are non-fibrous structures such as talc, kaolin, quartz, chalk and mica. Chalk in combination with glass fibers and components (A) and (B) has proven particularly advantageous.

Surprisingly, the compositions according to the invention having the relatively high proportions of component (B) can be converted into molding compositions at the requisite processing temperatures of from about 300° C. to about 350° C. without decomposition.

The molding compositions can be prepared in conventional mixers. Suitable mixers are compounders and single- and twin-screw extruders. For further processing, the resultant mixture can be granulated after the melt has solidified.

The production of moldings, fibers and films is carried out in processing machines which are conventional for this purpose. Moldings are preferably produced by all types of injection molding.

The moldings produced from the compositions according to the invention have high wear strength, i.e. they have excellent sliding behavior. At the same time, they retain the advantageous conventional mechanical properties of reinforced and filled moldings made from polyphenylene sulfide.

Moldings made from the compositions according to the invention can be particularly advantageously used as parts of industrial equipment which are subjected to constant movement and at the same time must slide on other equipment parts. The very good sliding properties of the surface required for this purpose and high wear strength of the parts are achieved by the invention.

The molding compositions may contain further conventional additives (E) which are conventional for plastics, such as lubricants, flow auxiliaries, mold-release agents, stabilizers, UV absorbers, inorganic pigments, organic dyes, inter alia. The amounts of these additives generally do not exceed 1% by weight of the total molding composition.

Examples

The molding compositions based on polyphenylene sulfide were produced by mixing and homogenizing the base components (see Table 1) using a 25 mm twin-screw extruder (type ZSK25, manufacturer Werner & Pfleiderer, Stuttgart, Germany) at a melt temperature of 310° C., and the cooled melt extrudate was comminuted to give granules. The resultant granules were dried and converted into test specimens of various dimensions in injection-molding machines under the standard conditions which are typical for polyphenylene sulfide compositions.

TABLE 1

|  | Example 1 | Example 2 | Example 3 | Comp. Example 1 |
|---|---|---|---|---|
| PPS[1] | 33.7 | 33.7 | 33.7 | 33.7 |
| Glass fibers[2] | 28.0 | 23.0 | 25.5 | 33.0 |
| Chalk[3] | 28.0 | 33.0 | 25.5 | 33.0 |
| UMM-PE[4] | 10 | 10 | 15 | — |
| Lubricant[5] | 0.3 | 0.3 | 0.3 | 0.3 |

[1] Polyphenylene sulfide powder, viscosity about 300 P at 1200 s⁻¹ and 315 C
[2] Cut glass fibers (4.5 mm) from Owens Corning Fiberglass
[3] ® "Millicarb" from Omya, Cologne, Germany
[4] Ultra high-molecular-weight polyethylene (® Hostalen GUR 812) from HOECHST AG, Frankfurt/Main, Germany
[5] Pentaerythritol tetrastearate The following method has been developed for wear testing ("Hoechst pad method"):

A test specimen having a diameter of 12.22 mm (an appropriate section of a thick injection-molded sheet) is pressed onto a rotating (v=136 m/min) metal roller ($\Phi$=65 mm) at a constant load of 3.04N. The widths of the scores are determined (under the microscope) after 6, 10, 24 and 60 hours.

The wear volumes are calculated from the width using an EDP program and given as the test result. In each case, 6 test specimens are tested. The mean is calculated from the individual values.

The results of the tests on Examples 1 to 3 and comparative Example 1 are shown in Tables 2 and 3.

TABLE 2

| | Wear volume (mm³) by the pad method | | | |
|---|---|---|---|---|
| Time (h) | Example 1 | Example 2 | Example 3 | Comp. Example 1 |
| 6 | 0.0732 | 0.0406 | 0.0526 | 0.2507 |
| 10 | 0.1314 | 0.0916 | 0.1123 | 0.3629 |
| 24 | 0.3807 | 0.2937 | 0.3126 | 0.6759 |
| 60 | 1.0640 | 0.9977 | 0.9202 | 1.7120 |

TABLE

| | Results of the mechanical tests | | | | | |
|---|---|---|---|---|---|---|
| Property | Method | Unit | Ex. 1 | Ex. 2 | Ex. 3 | Comp. Example 1 |
| Density | DIN 53 479, Method A | g/cm³ | 1.67 | 1.66 | 1.56 | 2.03 |
| Tear strength | DIN 53 455, ISO 570 | N/mm² | 102 | 81 | 79 | 111 |
| Elongation at break | DIN 53 455, ISO 570 | % | 1.3 | 1.1 | 1.1 | 1.0 |
| Charpy impact strength | DIN 53 453 | mJ/mm² | 18 | 16 | 16 | 19 |
| Charpy notched impact strength | DIN 53 453 | mJ/mm² | 7.5 | 6.0 | 6.3 | 7 |
| Izod rev. notched impact strength | ISO 180/1c | mJ/mm² | 13.2 | 13.2 | 11.6 | — |
| Izod notched impact strength | ISO 180/1A | mJ/mm² | | 5.5 | 5.7 | — |
| Heat deflection temperature HDT/C* | DIN 53 461, ISO 75 | °C. | 216 | 213 | 193 | 241 |

*HDT/A: in all cases > 260° C.
Number of test specimens: in most cases n = 10

We claim:
1. A thermoplastic molding composition comprising
(A) from 20 to 70% by weight of polyphenylene sulfide,
(B) from 5 to 20% by weight of ultrahigh-molecular-weight polyethylene,
(C) from 10 to 40% by weight of a fibrous reinforcing agent,
(D) from 10 to 40% by weight of an non-fibrous inorganic filler, and
(E) from 0 to 1% by weight of one or more conventional additives, chosen from the group consisting of lubricants, flow auxiliaries, mold-release agents, stabilizers, UV absorbers, inorganic pigments and organic dyes.

2. A thermoplastic composition as claimed in claim 1, comprising
(A) from 25 to 50% by weight of polyphenylene sulfide,
(B) from 7 to 17% by weight of ultrahigh-molecular-weight polyethylene,
(C) from 20 to 30% by weight of a fibrous reinforcing agent,
(D) from 20 to 30% by weight of an non-fibrous inorganic filler, and
(E) from 0 to 1% by weight of one or more conventional additives, chosen from the group consisting of lubricants, flow auxiliaries, mold-release agents, stabilizers, UV absorbers, inorganic pigments and organic dyes.

3. A molding composition as claimed in claim 1, wherein the ultra high-molecular-weight polyethylene has a mean molecular weight of at least 1,000,000.

4. A molding composition as claimed in claim 1, wherein the fibrous reinforcing agent is glass fibers.

5. A molding composition as claimed in claim 1, wherein the non-fibrous inorganic filler is chalk.

6. A moulding, fiber or film produced from a thermoplastic molding composition as claimed in claim 1.

7. A molding as claimed in claim 6 in the form of a wear-resistant industrial equipment part.

8. A molding as claimed in claim 6 in the form of a mechanically stressed sliding element in industrial equipment.

9. A processable thermoplastic molding composition comprising
(A) from 20 to 70% by weight of polyphenylene sulfide,
(B) from 5 to 20% by weight of ultrahigh-molecular-weight polyethylene,
(C) from 10 to 40% by weight of a fibrous reinforcing agent,
(D) from 10 to 40% by weight of an non-fibrous inorganic filler, and
(E) from 0 to 1% by weight of one or more additive chosen from the group consisting of lubricants, flow auxiliaries, mold-release agents, stabilizers, UV absorbers, inorganic pigments, and organic dyes,
said composition being processable at temperatures of from about 300° C. to about 350° C. without decomposition.

* * * * *